United States Patent [19]
Takahashi

[11] 4,234,172
[45] Nov. 18, 1980

[54] HYDRAULIC SHOCK ABSORBER AND SPRING COMBINATION

[75] Inventor: Noriyuki Takahashi, Tokyo, Japan
[73] Assignee: Honda Giken Kogyo Kabushiki Kaisha, Tokyo, Japan
[21] Appl. No.: 22,438
[22] Filed: Mar. 21, 1979
[30] Foreign Application Priority Data

Mar. 23, 1978 [JP] Japan .............................. 53-37258[U]

[51] Int. Cl.³ ..................................................... F16F 13/00
[52] U.S. Cl. ...................................... 267/8 R; 188/298; 267/35; 267/122; 267/127; 267/152; 280/708
[58] Field of Search ................. 188/298; 267/8 R, 35, 267/152, 153, DIG. 1, 64 R, 64 B, 122, 65 R, 124, 126, 127; 280/697, 708, 710, 692

[56] References Cited
U.S. PATENT DOCUMENTS

| | | | |
|---|---|---|---|
| 2,918,305 | 12/1959 | Faiver | 267/DIG. 1 |
| 3,582,106 | 6/1971 | Keijzer | 267/64 B X |
| 3,770,258 | 11/1973 | Takahashi et al. | 188/298 X |
| 4,010,829 | 3/1977 | Naito et al. | 267/64 R X |

FOREIGN PATENT DOCUMENTS 589984 1/1960 Canada .................................. 267/64 R

*Primary Examiner*—George E. A. Halvosa
*Attorney, Agent, or Firm*—Irving M. Weiner; John L. Shortley; Melvin Yedlin

[57] ABSTRACT

A hydraulic shock absorber for use on vehicles which includes a rubber attachment on the upper end thereof which is supported on the vehicle. A cap sealingly covers the rubber attachment to provide a sealed chamber communicating with oil in the cylinder of the shock absorber. A partition provided with a communicating hole is disposed in the chamber. A flexible membrane is disposed above the partition in the chamber and divides the chamber into sealed compartments. One of the sealed compartments is filled with pressurized gas, and the other sealed compartment is held in communication with the interior of the shock absorber. The arrangement of the invention provides a shock absorber with an improved secondary performance in dampening forces between the shock absorber and the body of the vehicle.

7 Claims, 3 Drawing Figures

HYDRAULIC SHOCK ABSORBER AND SPRING COMBINATION

BACKGROUND OF THE INVENTION

1. Field of the Invention

The present invention relates to a hydraulic shock absorber which includes additional pneumatic means for improving the secondary performance of the shock absorber.

2. Description of the Art

It is known that a hydraulic shock absorber contains oil sealed therein for dampening applied forces. A shock absorber construction is disclosed in U.S. Pat. No. 3,770,258 which includes a cap covering a rubber mount by which the shock absorber is supported on a vehicle body, the cap providing a closed space which is filled with oil from the shock absorber proper. The space defined in part by the rubber mount is variable in volume as the rubber mount is resiliently deformed. Such volume variation of the space is functionally combined with the hydraulic pressure within the space to provide a shock-absorbing function of the shock absorber. The primary performance of the shock absorber resides in the interaction between the shock absorber and a wheel on which the shock absorber acts, and a secondary performance of the shock absorber resides in the interaction between the shock absorber and a vehicle body upon which the shock absorber is mounted, with the result that the shock absorber has a combined springing characteristic for increased dampening action. Such shock absorber construction is advantageous in that it is simple in structure and provides a space-saving feature in that the cap is positioned at one end of the shock absorber, adjacent to the vehicle body.

The secondary performance of the conventional shock absorber which takes place between the shock absorber and the vehicle body is functionally dependent on hydraulic pressure and resilient deformation of the rubber mount, the resiliency of the rubber mount being proportional to the amount of load acting thereon. The problem with such arrangement is that the springing characteristic of the rubber mount should be determined with respect to the maximum loading capacity of the vehicle. Thus, the rubber mount becomes relatively rigid when the vehicle is lightly loaded, resulting in discomfort to passengers of the vehicle.

Pneumatic cushioning utilizing gas pressure such as air pressure has been practiced in a variety of fields. Such pneumatic cushioning can provide a desired soft springing characteristic under a given amount of loading and stroke, but beyond such given amount the pneumatic cushioning causes the spring constant to rapidly become higher, thereby resulting in less comfort to the passengers when the vehicle is heavily loaded.

The present invention provides a hydraulic shock absorber for vehicles which eliminates the above-described difficulties and utilizes hydraulic pressure as well as the resiliency of a rubber mount, while also employing pneumatic cushioning.

SUMMARY OF THE INVENTION

The present invention provides a hydraulic shock absorber for use on vehicles which includes a cylinder supported adjacent a wheel of the vehicle, a piston slidably disposed in the cylinder, and a rod connected at the lower end thereof with the piston. An attachment formed of elastic material is connected to the upper end of the rod, and the rod is supported by a portion of the vehicle body through the attachment. A cap sealingly covers the attachment to define above the attachment a sealed chamber communicating with oil in the cylinder. A partition is disposed in the chamber, and is provided with a communicating hole. A flexible membrane is disposed above the partition in the chamber to define first and second substantially sealed compartments, the first compartment being filled with pressurized gas, and the second compartment being held in communication with the interior of the shock absorber.

An object of the present invention is to provide a hydraulic shock absorber utilizing hydraulic pressure as well as the resiliency of a rubber mount, with the shock absorber also employing pneumatic cushioning.

According to the invention, a hydraulic shock absorber includes a sealed chamber located at its upper end near a vehicle body, the sealed chamber being defined in part by a rubber mount provided on the shock absorber. The chamber includes a partition having an aperture therein, and is divided into upper and lower compartments by a flexible membrane provided on the partition. The upper compartment is filled with pressurized gas and the lower compartment communicates with the interior of the shock absorber so as to be supplied with oil therefrom.

Accordingly, the shock absorber according to the present invention has a secondary performance characteristic provided jointly by the springing property of combined hydraulic pressure and rubber, and by the springing property of pneumatic pressure. With this arrangement, the pneumatic cushioning eliminates the above-described defect experienced with the resilient action of the rubber mount in a lightly loaded vehicle, and the resiliency of the rubber eliminates the defect experienced with pneumatic cushioning action in a heavily loaded vehicle. Thus, a desired springing characteristic is provided which is effected over a wide range of loading conditions. More specifically, the shock absorber of the invention provides a pneumatic cushioning action for an improved dampening property during light loading conditions, and a rubber cushioning action for a dampening property in response to the amount of loading during heavy loading conditions, both cushioning actions being attainable with hydraulic pressure. Therefore, with the combined cushioning properties of the gas and rubber, the shock absorber provides an enhanced dampening capability over a full range of loading conditions to provide increased passenger comfort.

Because the flexible membrane which divides the chamber is provided on the partition in such a manner as to overlie the partition, when the membrane flexes under variations in hydraulic pressure the predetermined shape thereof is maintained by the partition. The membrane can thus function normally, smoothly and reliably without deformation to ensure durability and longevity thereof. Further, the shock absorber according to the invention ensures that the membrane will retain its configuration prior to its attachment to the vehicle, to thus facilitate assembly thereof.

The shock absorber according to the invention can be manufactured without costly structural changes in a conventional shock absorber construction because the major changes reside in the provision of a partition and flexible membrane in the sealed chamber, the upper compartment being filled with pressurized gas and the lower compartment being held in communication with the interior of the shock absorber. Accordingly, the shock absorber of the invention is structurally simple, can be manufactured inexpensively, and provides improved performance characteristics.

Other objects, features, and advantages of the present invention will become apparent from the following description when read in conjunction with the accompanying drawings which illustrate a preferred exemplary embodiment of the present invention.

DETAILED DESCRIPTION

Figure 1:
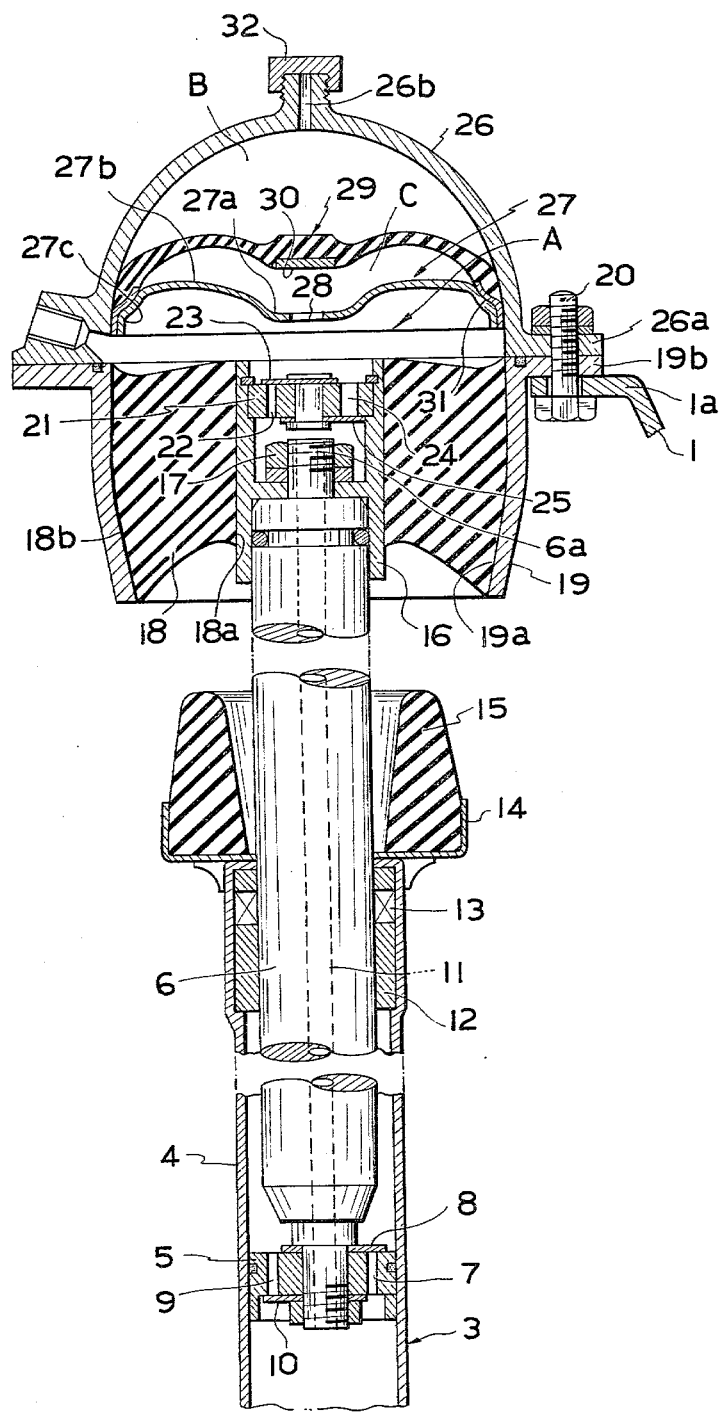
FIG. 1 is a vertical cross-sectional view of a shock absorber constructed in accordance with the present invention.
Figure 3:
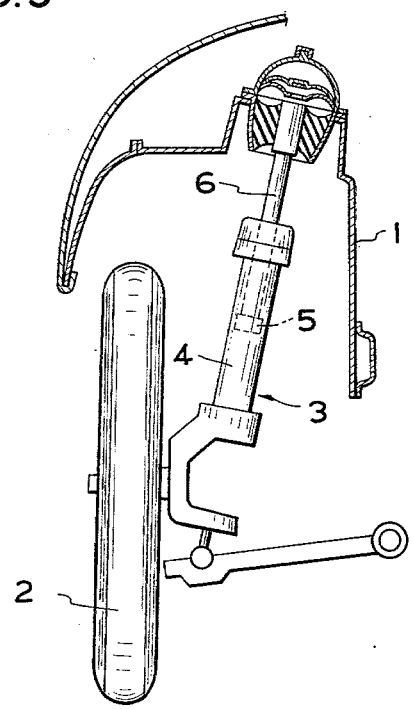
FIG. 3 is a view illustrating the shock absorber attached to a vehicle body and a wheel.

With reference to FIG. 3, there is shown a vehicle body 1 and a wheel 2 between which extends a hydraulic shock absorber 3 including a cylinder 4, the lower end of shock absorber 3 being supported on the axle of wheel 2. Slidably disposed in cylinder 4 is a piston 5 to which is connected a rod 6. Rod 6 extends out of cylinder 4 and has the upper end thereof supported on vehicle body 1. As shown in FIG. 1, piston 5 is equipped with a check valve 8 for opening an orifice 7 during a compression stroke of shock absorber 3. Another check valve 10 is provided for opening an orifice 9 during an extension stroke of shock absorber 3. Rod 6 has a passage 11 extending axially therethrough.

Cylinder 4 is provided adjacent its upper end portion with a rod guide 12 and an oil seal 13. At the upper end of cylinder 4 is provided a holder 14 which holds an annular rubber bumper 15 projecting upwardly away from cylinder 4.

At the upper end of rod 6 is provided a reduced diameter portion 6a which is secured to an attachment collar 16 with a nut 17. Disposed around collar 16 is a rubber attachment 18 with the inner peripheral surface 18a of its central portion firmly attached (such as by burning) to collar 16, and with the outer peripheral surface 18b of its outer portion firmly attached (such as by burning) to the inner peripheral surface 19a of an annular holder 19. Holder 19 is provided at its upper end with a flange 19b extending radially outwardly and connected by a bolt 20 to a bracket 1a of vehicle body 1. A valve body 21 is mounted within attachment collar 16 at the upper portion thereof and is disposed above the upper end of rod 6. Valve body 21 includes a check valve 23 for opening an orifice 22 during the compression stroke and another check valve 25 for opening an orifice 24 during the extension stroke.

Placed on top of holder 19 with rubber attachment 18 therein is a cap 26 which is in the form of an inverted cup. Cap 26 is provided at its lower end with a flange 26a extending radially outwardly and held in mating engagement with flange 19a of holder 19. Flange 26a is fastened, together with flange 19a, to the bracket 1a by bolt 20. Cap 26 thus provides a sealed space or chamber A above rubber attachment 18, with an upper surface of rubber attachment 18 acting as a bottom for sealed chamber A.

A partition 27 made of a rigid material is disposed in cap 26 in the central or lower portion thereof. Partition 27 is provided with a central hole 28 formed in a central portion 27a which is surrounded by an annular ridge portion 27b. An outer peripheral edge portion 27c of partition 27 is bent downwardly and attached to the inner surface of cap 26.

Figure 2:
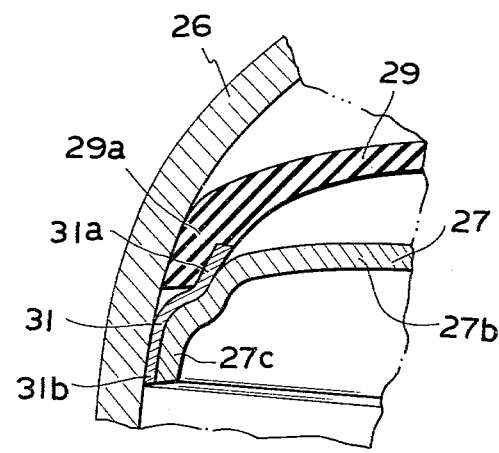
FIG. 2 is an enlarged view of a portion of the shock absorber of FIG. 1.

A flexible membrane 29 made, for example, of rubber, is disposed on partition 27 in such a manner as to overlie it, and divides chamber A into upper and lower compartments B and C, the compartments being isolated from each other by membrane 29 therebetween. As shown in FIG. 2, partition 27 is provided with an annular brace 31 of rigid material. An upper edge 31a of brace 31 is bent radially inwardly and is directed upwardly. A peripheral edge 29a of membrane 29 is bonded on its inner side to upper edge 31a of brace 31, for example, by burning. A lower edge portion 31b of annular brace 31, as well as peripheral edge portion 27c of partition 27, are jointly welded to the inner surface of cap 26. Peripheral edge 29a of membrane 29 is thus pressed air-tightly against the inner surface of cap 26, and a desired degree of sealing between the upper and lower compartments is thus obtained. Membrane 29 has a central reinforcement 30, which may be in the form of a steel disk. Reinforcement 30 is disposed on the lower surface of membrane 29 in opposed axial alignment with hole 28 in partition 27.

Upper sealed compartment B is filled with pressurized gas, such as air, which is supplied through an inlet port 26b in the top of cap 26. After compartment B has been filled with the gas, inlet port 26b is closed off by a cover 32, whereupon compartment B acts as a pneumatic pressure chamber. Lower compartment C is sectioned by partition 27 into upper and lower spaces which communicate with each other through hole 28, and is held in fluid communication with passage 11 in rod 6. In this manner, lower compartment C functions as a hydraulic pressure chamber.

With such arrangement, oil is directed from below piston 5 in shock absorber 3 through passage 11 in rod 6 into lower compartment C in chamber A. When the vehicle is empty, the hydraulic pressure is low and membrane 29 is held in contact with partition 27 under the pneumatic pressure in upper compartment B. Membrane 29 is prevented from being displaced downwardly by partition 27, with hole 28 being covered by reinforcement 30.

When the vehicle becomes loaded with cargo and/or passengers, hydraulic pressure builds in lower compartment C, and membrane 29 is lifted by such pressure build-up. Impacts and vibrations caused while the vehicle is running are damped by sliding movement of piston 5 in cylinder 4. In this manner, a substantial shock shock-absorbing action is provided between wheel 2 and shock absorber 3.

When variations in hydraulic pressure due to impacts and vibrations are excessive and cannot be accommodated by movement of piston 5, oil is introduced through passage 11 and valve 21 into lower compartment C, which then becomes pressurized, causing membrane 29 to be raised against the gas pressure for dampening such impacts and vibrations. In this manner, secondary shock absorbing performance is provided between shock absorber 3 and vehicle body 1.

It can thus be seen that the major hydraulic dampening action takes place between the wheel and the shock absorber, whereas the secondary dampening action takes place between the vehicle body and the shock absorber. Such secondary dampening performance is based on the springing action by pneumatic pressure in upper compartment B as long as the vehicle is lightly loaded and the motion of piston 5 is confined within a small stroke. Therefore, the dampening action is smooth and soft even if the spring constant of rubber attachment 18 is preselected to match the maximum loading condition of the vehicle.

When the vehicle is heavily loaded, upper compartment B becomes pressurized to its limit value under the hydraulic pressure in the lower compartment C, when the spring constant is very high. However, rubber attachment 18 yields and becomes resiliently deformed under such high oil pressure, causing lower compartment C to vary in volume for maintaining desired springing action during heavy loading. Therefore, the shock absorber 3 in accordance with the present invention provides a combined pneumatic and rubber spring action for a full range of loading conditions, i.e., regardless of variations in the amount of loading, for a desired degree of dampening action.

Although the hydraulic pressure in lower compartment C is zero prior to attachment of shock absorber 3 to the vehicle, and hence membrane 29 tends to be displaced toward the rubber attachment 18, membrane 29 is properly supported by contact with partition 27 to prevent malfunctioning or localized breakage after assembly. During operation, membrane 29 is also supported by partition 27 against localized deterioration and breakage due to concentrated stresses, and membrane 29 can thus function durably over a long period of time.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. A hydraulic shock absorber for use on vehicles, comprising:
   a cylinder supported adjacent a wheel of the vehicle;
   a piston slidably disposed in said cylinder;
   a rod connected at the lower end thereof with said piston;
   an elastic attachment having a central portion and an outer portion;
   said elastic attachment being connected at an inner peripheral surface of said central portion thereof to the upper end of said rod, and at an outer peripheral surface of said outer portion thereof to an annular holder, said annular holder being connected to a vehicle body portion;
   a cap sealingly covering said elastic attachment to define a sealed chamber between said elastic attachment and said cap;
   a substantially rigid partition disposed in said chamber above said elastic attachment, said partition being provided with a communicating hole;
   a flexible membrane disposed above said partition in said chamber to define a first substantially sealed compartment between said membrane and said cap and a second substantially sealed compartment between said membrane and said elastic attachment, said first and second compartments being sealed from each other by said flexible membrane;
   said rod being provided with an axial passage therethrough which interconnects opposite sides of said partition through said communicating hole in said second compartment of said sealed chamber with said cylinder;
   said second compartment of said sealed chamber, said axial passage, and said cylinder being adapted to be filled with oil which contacts said elastic body within said sealed chamber;
   said first compartment of said sealed chamber being filled with pressurized gas; and
   said membrane being movable in response to hydraulic pressure build-up in said second compartment, against the gas pressure in said first compartment, whereby a secondary dampening effect between the vehicle body and said shock absorber is provided by the springing action of gas pressure within said first compartment against said flexible membrane.

2. A hydraulic shock absorber according to claim 1, wherein:
   said elastic attachment is formed of rubber.

3. A hydraulic shock absorber according to claim 2, wherein:
   said communicating hole is located centrally in said partition; and
   said partition includes an annular ridge portion surrounding said hole.

4. A hydraulic shock absorber according to claim 2, wherein:
   said flexible membrane is provided with a reinforcement member thereon, said reinforcement member being disposed in opposite relation to said hole in said partition.

5. A hydraulic shock absorber according to claim 2, further including:
   an annular brace formed of substantially rigid material disposed in said chamber and connected, together with the outer peripheral edge of said partition, to said cap; and
   said membrane being sealingly attached at the peripheral edge thereof to said cap and being disposed on said annular brace.

6. A hydraulic shock absorber according to claim 2, wherein:
   said flexible membrane is fabricated of rubber.

7. A hydraulic shock absorber according to claim 1, wherein:
   said partition is disposed substantially adjacent said flexible membrane so as to support said flexible membrane under normal substantially low-pressure conditions of said second compartment of said sealed chamber.

* * * * *